(12) United States Patent
Ault, Jr.

(10) Patent No.: US 6,906,723 B2
(45) Date of Patent: Jun. 14, 2005

(54) GENERATING PARTIALS FOR PERSPECTIVE CORRECTED TEXTURE COORDINATES IN A FOUR PIXEL TEXTURE PIPELINE

(75) Inventor: David N. Ault, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 09/820,462

(22) Filed: Mar. 29, 2001

(65) Prior Publication Data

US 2002/0190996 A1 Dec. 19, 2002

(51) Int. Cl.$^7$ ................................................. G09G 5/00
(52) U.S. Cl. ........................ 345/582; 345/583; 345/586; 345/588
(58) Field of Search ................................ 345/582, 583, 345/586, 588, 528

(56) References Cited

U.S. PATENT DOCUMENTS 6,204,875 B1 * 3/2001 De Loor et al. ............ 345/582

* cited by examiner

*Primary Examiner*—Matthew C. Bella
*Assistant Examiner*—Tam Tran
(74) *Attorney, Agent, or Firm*—Duke W. Yee; Mark E. McBurney; Francis Lammes (57) ABSTRACT

A method, program and apparatus for generating partial differential equations for perspective corrected texture coordinates in a computer graphics display are provided. The present invention comprises calculating texture coordinates for four adjacent pixels and then determining the differences between the coordinates. A perspective correction factor is then calculated, which is multiplied by each coordinate difference.

15 Claims, 3 Drawing Sheets

GENERATING PARTIALS FOR PERSPECTIVE CORRECTED TEXTURE COORDINATES IN A FOUR PIXEL TEXTURE PIPELINE

BACKGROUND OF THE INVENTION

1. Technical Field

The present invention relates to computer graphics. More specifically, the present invention relates to the selection of pixel density and image texture.

2. Description of Related Art

In computer graphics, the purpose of determining partials is to find the rate of change inside the texture map with respect to the current pixel being processed. Partials are the partial derivatives of the texture coordinates with respect to the screen coordinates. A texture map is an image stored in memory that is applied on a per-pixel basis to rendered primitives (graphics elements that are used as building blocks for creating images, such as a point, line, arc, cone or sphere). These partials are used to pick a Level of Detail (LOD) which has the closest rate of change to one.

Triangle partials are used by the rasterizing hardware to step in the x and y direction to render pixels to the frame buffer. Perspective correction generates nonlinear changes across the texture map so that the resulting image is in accordance to the view point being rendered. Normally the partials match the triangle partials, but if the texture coordinates are perspective corrected this is not true and the hardware has to perform a calculation on a per pixel basis to find the true partial.

Therefore, it would be desirable to have a method for generating partials for perspective corrected texture coordinates which requires fewer multiplies than the traditional method of calculating the partials for each pixel separately.

SUMMARY OF THE INVENTION

The present invention provides a method, program and apparatus for generating partial differential equations for perspective corrected texture coordinates in a computer graphics display. The present invention comprises calculating texture coordinates for four adjacent pixels and then determining the differences between the coordinates. A perspective correction factor is then calculated, which is multiplied by each coordinate difference.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
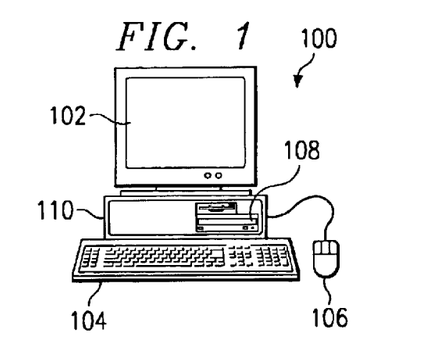
FIG. 1 depicts a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
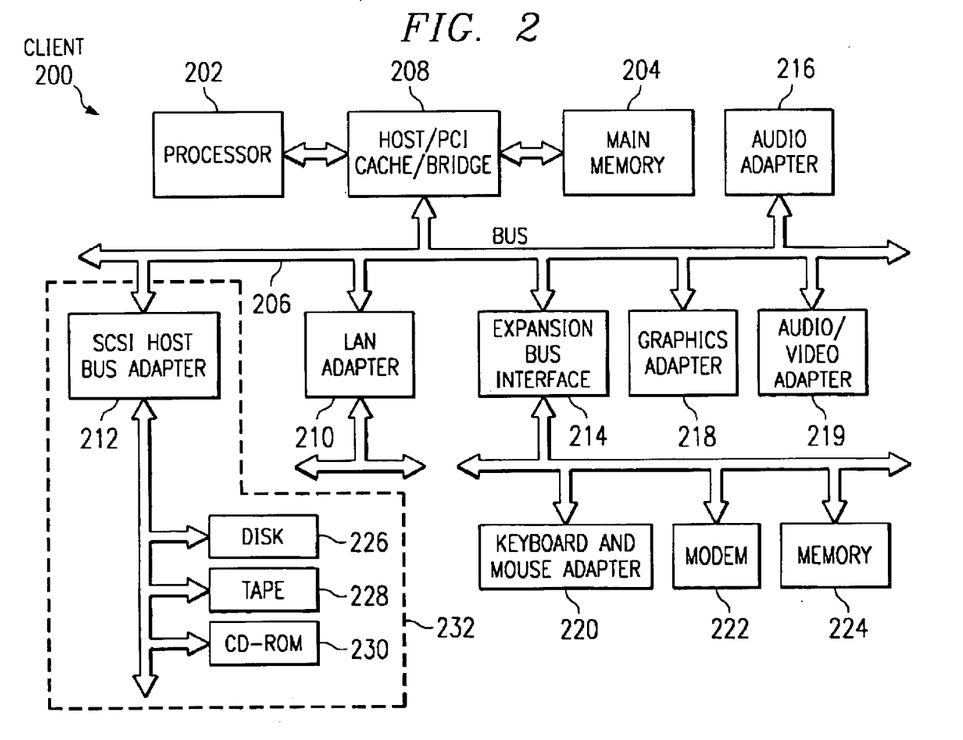
FIG. 2 depicts a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/ or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230. The present invention can be implemented in graphics adapter 218.

It has become possible to process multiple texture pixels in a cycle with the advance of silicon technology. In a system that lights four texture pixels simultaneously, the partials can be calculated by taking the difference between the calculated texture coordinates at each of the four adjacent pixels and then multiplying each difference by a factor based on the perspective correction coordinate. This method requires fewer multiplies than the traditional method of calculating the partials for each pixel separately.

In the following description, the term "multiply" refers to the process of multiplication between numbers. In hardware, a multiply would be replaced with a multiplication unit (i.e. floating point or fixed point multiplication unit). The same applies to the terms "subtracts" and "adds". These functions can be replaced by actual hardware units implementing the functions, or replaced in software with a line of code performing those functions.

S, T, R, and Q are texture coordinates that are sent at each vertex of a triangle to index into a texture map. S, T, R, and Q as capital letters refer to the non-perspective corrected coordinates.

The lower case s, t, r, and q are the perspective corrected version of the texture coordinates. They can be written as:

$$s = \frac{S}{Q} \qquad \text{eq. 1}$$

$$t = \frac{T}{Q} \qquad \text{eq. 2}$$

$$r = \frac{R}{Q} \qquad \text{eq. 3}$$

$$qr = \frac{1}{Q} \qquad \text{eq. 4}$$

The standard method for calculating the partials is derived by taking the partial derivative of the perspective corrected coordinate with respect to the screen coordinate or $$\frac{\partial s}{\partial x}.$$

Using eq. 1 this yields:

$$\frac{\partial s}{\partial x} = \frac{\partial}{\partial x}\left(\frac{S}{Q}\right) \qquad \text{eq. 5}$$

Using the Quotient Rule of Derivatives:

$$\frac{\partial s}{\partial x} = \frac{Q\frac{\partial S}{\partial x} - S\frac{\partial Q}{\partial x}}{Q^2} \qquad \text{eq. 6}$$

The partials on the right hand side of eq. 6 are the triangle partials of the non-persepctive corrected texture coordinates. Eq. 6 can be reduced to:

$$\frac{\partial s}{\partial x} = \frac{1}{Q}\left(\frac{\partial S}{\partial x} - \frac{S}{Q}\frac{\partial Q}{\partial x}\right) \qquad \text{eq. 7}$$

Substituting in eq. 1 and eq. 4 generates the standard equation:

$$\frac{\partial s}{\partial x} = qr\left(\frac{\partial S}{\partial x} - S\frac{\partial Q}{\partial x}\right) \qquad \text{eq. 8}$$

Eq. 9 is what is typically implemented in hardware applications. There are two multiplies and one subtract per partial. The actual value needed is $$\frac{\partial u}{\partial x},$$

where u is an additional way for indexing the texture map that ranges from 0 to the width of the texture map vs. from 0 to 1 with s.

$$u = sw \qquad \text{eq. 9}$$

(where w is the width)

Since w is constant across the texture map:

$$\frac{\partial u}{\partial x} = \frac{\partial s}{\partial x} w \qquad \text{eq. 10}$$

This yields a final equation of:

$$\frac{\partial u}{\partial x} = qr\left(\frac{\partial S}{\partial x} - S\frac{\partial Q}{\partial x}\right) w \qquad \text{eq. 11}$$

In some hardware systems the width, height and depth are restricted to values that are powers of two. In such a case, exponents can be added instead of doing a multiply. However, since more systems are moving to non-power-of-two textures, and because the present discussion is only concerned with the generic set of equations for calculating partials, the width factor will be treated as a multiply. This yields a total of 72 multiplies and 24 subtracts for calculating all the partials (3D included) for four pixels simultaneously.

Figure 3:
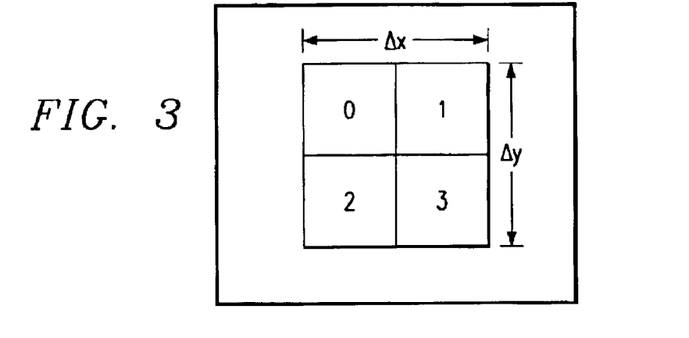
FIG. 3 depicts a schematic diagram illustrating an arrangement of pixels in accordance with the present invention.

Referring now to FIG. 3, a schematic diagram illustrating an arrangement of pixels is depicted in accordance with the present invention. With a texture engine that lights four pixels in a cycle, this new algorithm can be implemented. The pixels must be adjacent so that the deltas between x values and y values are always one. FIG. 3 shows the arrangement.

It should be noted that the subscripts on the texture coordinates in the equations refer to the coordinates for the associated pixel in FIG. 3.

If perspective correction is off, it makes sense that:

$$\frac{\partial u}{\partial x} = \frac{\Delta u}{\Delta x} \qquad \text{eq. 12}$$

Since, for this case, $\Delta x = 1$ (see FIG. 1) this can be rewritten:

$$\frac{\Delta u}{\Delta x} = u_1 - u_0 \qquad \text{eq. 13}$$

This, however, is not correct if the texture is perspective corrected. Again, since the width is constant:

$$\frac{\Delta u}{\Delta x} = (s_1 - s_0)w \qquad \text{eq. 14}$$

Going back to eq. 1, s1 and s0 can be found as:

$$s_1 = \frac{S_1}{Q_1} \qquad \text{eq. 15}$$

$$s_0 = \frac{S_0}{Q_0} \qquad \text{eq. 16}$$

In the rasterizing process, subsequent coordinates are found by adding the partials in the given directions. Therefore:

$$S_1 = S_0 + \frac{\partial S}{\partial x} \qquad \text{eq. 17}$$

$$Q_1 = Q_0 + \frac{\partial Q}{\partial x} \qquad \text{eq. 18}$$

Using eq. 14 the slope for s can be found.

$$\frac{\Delta s_0}{\Delta x} = \frac{S_0 + \frac{\partial S}{\partial x}}{Q_0 + \frac{\partial Q}{\partial x}} - \frac{S_0}{Q_0} \qquad \text{eq. 19}$$

It is obvious that eq. 19 does not match eq. 8, but if the error between them can be found, a new solution for $$\frac{\partial u}{\partial x}$$

can be generated using the error term. The error is:

$$\text{error} = \frac{eq19 - eq8}{eq8} \qquad \text{eq. 20}$$

or $$\text{error} = \frac{eq19}{eq8} - 1 \qquad \text{eq. 21}$$

Substituting the error into the equation produces the following equation:

$$\text{error} = \frac{\frac{S_0 + \frac{\partial S}{\partial x}}{Q_0 + \frac{\partial Q}{\partial x}} - \frac{S_0}{Q_0}}{\frac{1}{Q_0}\left(\frac{\partial S}{\partial x} - \frac{S_0}{Q_0}\frac{\partial Q}{\partial x}\right)} - 1 \qquad \text{eq. 22}$$

Reduction of eq. 22:

$$Q_0 \frac{\left[\frac{S_0 + \frac{\partial S}{\partial x}}{Q_0 + \frac{\partial Q}{\partial x}}\right]}{\frac{\partial S}{\partial x} - \frac{S_0}{Q_0}\frac{\partial Q}{\partial x}} - \left[\frac{S_0}{\frac{\partial S}{\partial x} - \frac{S_0}{Q_0}\frac{\partial Q}{\partial x}} - 1\right]$$

$$\frac{Q_0 \left[\frac{S_0 + \frac{\partial S}{\partial x}}{Q_0 + \frac{\partial Q}{\partial x}}\right] - S_0}{\frac{\partial S}{\partial x} - \frac{S_0}{Q_0}\frac{\partial Q}{\partial x}} - 1$$

$$\frac{\frac{Q_0 S_0}{Q_0 + \frac{\partial Q}{\partial x}} - \left(\left(\frac{Q_0 \frac{\partial S}{\partial x}}{Q_0 + \frac{\partial Q}{\partial x}}\right) - \left(\frac{Q_0 S_0}{Q_0 + \frac{\partial Q}{\partial x}} - \frac{S_0 \frac{\partial Q}{\partial x}}{Q_0 + \frac{\partial Q}{\partial x}}\right)\right)}{\frac{\partial S}{\partial x} - \frac{S_0}{Q_0}\frac{\partial Q}{\partial x}} - 1$$

$$\frac{\frac{Q_0 \frac{\partial S}{\partial x} - S_0 \frac{\partial Q}{\partial x}}{Q_0 + \frac{\partial Q}{\partial x}}}{\left(Q_0 \frac{\partial S}{\partial x} - S_0 \frac{\partial Q}{\partial x}\right)\frac{1}{Q_0}} - 1$$

$$\frac{Q_0 \frac{\partial S}{\partial x} - S_0 \frac{\partial Q}{\partial x}}{Q_0 + \frac{\partial Q}{\partial x}} \cdot \frac{Q_0}{Q_0 \frac{\partial S}{\partial x} - S_0 \frac{\partial S}{\partial x}} - 1$$

$$\text{error} = \frac{Q_0}{Q_0 + \frac{\partial Q}{\partial x}} - 1 \qquad \text{eq. 23}$$

It should be noted that the form of this equation matches the original error equation (eq. 21). Setting them equal produces:

$$\frac{Q_0}{Q_0 + \frac{\partial Q}{\partial x}} - 1 = \frac{\frac{\Delta s_0}{\Delta x}}{\frac{\partial s_0}{\partial x}} - 1 \qquad \text{eq. 24}$$

Therefore:

$$\frac{\partial s_0}{\partial x} = \frac{\Delta s_0}{\Delta x}\left(\frac{Q_0 + \frac{\partial Q}{\partial x}}{Q_0}\right) \qquad \text{eq. 25}$$

Substituting eq. 18 into eq. 25:

$$\frac{\partial s_0}{\partial x} = \frac{\Delta s_0}{\Delta x}\left(\frac{Q_1}{Q_0}\right) \qquad \text{eq. 26}$$

or $$\frac{\partial s_0}{\partial x} = \frac{\Delta s_0}{\Delta x} q_1 q r_0 \qquad \text{eq. 27}$$

Since, ultimately, $$\frac{\partial u}{\partial x}$$

is being sought, the equations 10 and 14 can be used to substitute in and rewrite equation 27 in terms of $$\frac{\partial u}{\partial x},$$

which yields equation 28:

$$\frac{\partial u_0}{\partial x} = \frac{\Delta u_0}{\Delta x} q_1 q r_0 \qquad \text{eq. 28}$$

Equation 28 has one subtract and two multiplies per partial. Each partial can be derived similarly to eq. 28. In total, this yields 48 multiplies versus 72 multiplies for the standard equations.

Figure 4:
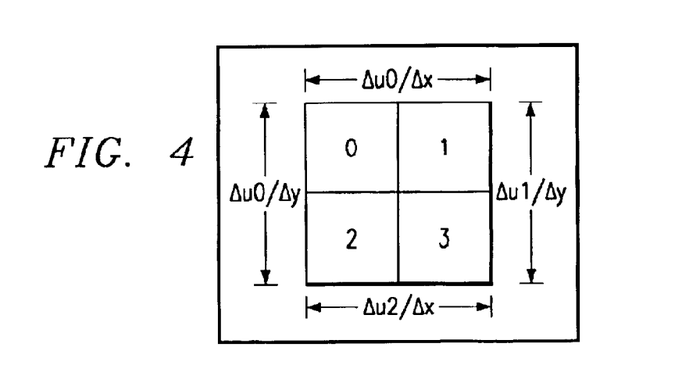
FIG. 4 depicts a schematic diagram illustrating the definition of the deltas for adjacent pixels in accordance with the present invention.

Referring to FIG. 4, a schematic diagram illustrating the definition of the deltas for adjacent pixels is depicted in accordance with the present invention. To define the rest of the partials all of the deltas for a group of four adjacent pixels must first be defined. Each number in FIG. 4 represents a texture coordinate (u). FIG. 4 defines the differences between u0 and u1, divided by the change in x as $$\frac{\Delta u_0}{\Delta x}.$$

The same applies to the other changes depicted in FIG. 4.

$$\frac{\Delta u_1}{\Delta y}$$

is defined as the difference between u1 and u3, divided by the change in y. As the change in x and change in y are always one (the pixels are adjacent), FIG. 4 defines equations 29 through 32.

Equations 29 through 32 show the equations for each of the deltas.

$$\frac{\Delta u_0}{\Delta x} = u_1 - u_0 \qquad \text{eq. 29}$$

$$\frac{\Delta u_2}{\Delta x} = u_3 - u_2 \qquad \text{eq. 30}$$

$$\frac{\Delta u_0}{\Delta y} = u_2 - u_0 \qquad \text{eq. 31}$$

$$\frac{\Delta u_1}{\Delta y} = u_3 - u_1 \qquad \text{eq. 32}$$

From similar derivations of equation 28 the following set of equations (33 to 40) can be found. These equations describe how u is moving for all four pixels. The equations for the other texture components v and w are found exactly the same as u. Substitute v and w wherever there is a u produces the v and w equations.

$$\frac{\partial u_0}{\partial x} = \frac{\Delta u_0}{\Delta x} q_1 r_0 \qquad \text{eq. 33}$$

$$\frac{\partial u_1}{\partial x} = \frac{\Delta u_0}{\Delta x} q_0 r_1 \qquad \text{eq. 34}$$

$$\frac{\partial u_2}{\partial x} = \frac{\Delta u_2}{\Delta x} q_3 r_2 \qquad \text{eq. 35}$$

$$\frac{\partial u_3}{\partial x} = \frac{\Delta u_2}{\Delta x} q_2 r_3 \qquad \text{eq. 36}$$

$$\frac{\partial u_0}{\partial y} = \frac{\Delta u_0}{\Delta y} q_2 r_0 \qquad \text{eq. 37}$$

$$\frac{\partial u_1}{\partial y} = \frac{\Delta u_1}{\Delta y} q_3 r_1 \qquad \text{eq. 38}$$

$$\frac{\partial u_2}{\partial y} = \frac{\Delta u_0}{\Delta y} q_0 r_2 \qquad \text{eq. 39}$$

$$\frac{\partial u_3}{\partial y} = \frac{\Delta u_1}{\Delta y} q_1 r_3 \qquad \text{eq. 40}$$

In the next equation for v0 the delta is also multiplied by q1qr0:

$$\frac{\partial v_0}{\partial x} = \frac{\Delta v_0}{\Delta x} q_1 r_0 \qquad \text{eq. 41}$$

This holds true for all the partials of u, v and w. This means that in a hardware application eight factors can be calculated that each of the deltas can be multiplied by correspondingly to get the final results.

The final algorithm in equation form (eq. 42 to 73) is presented below. The algorithm uses 12 subtracts and 32 multiplies, versus the 24 subtracts and 72 multiplies of the standard algorithm in the prior art.

The factors:

$$f_{x_0} = q_1 r_0 \qquad \text{eq. 42}$$

$$f_{x_1} = q_0 r_1 \qquad \text{eq. 43}$$

$$f_{x_2} = q_3 r_2 \qquad \text{eq. 44}$$

$$f_{x_3} = q_2 r_3 \qquad \text{eq. 45}$$

$$f_{y_0} = q_2 r_0 \qquad \text{eq. 46}$$

$$f_{y_1} = q_3 r_1 \qquad \text{eq. 47}$$

$$f_{y_2} = q_0 r_2 \qquad \text{eq. 48}$$

$$f_{y_3} = q_1 r_3 \qquad \text{eq. 49}$$

The partials:

$$\frac{\partial u_0}{\partial x} = \frac{\Delta u_0}{\Delta x} f_{x_0} \qquad \text{eq. 50}$$

$$\frac{\partial u_0}{\partial y} = \frac{\Delta u_0}{\Delta y} f_{y_0} \qquad \text{eq. 51}$$

$$\frac{\partial v_0}{\partial x} = \frac{\Delta v_0}{\Delta x} f_{x_0} \qquad \text{eq. 52}$$

$$\frac{\partial v_0}{\partial y} = \frac{\Delta v_0}{\Delta y} f_{y_0} \qquad \text{eq. 53}$$

-continued $$\frac{\partial w_0}{\partial x} = \frac{\Delta w_0}{\Delta x} f_{x_0} \qquad \text{eq. 54}$$

$$\frac{\partial w_0}{\partial y} = \frac{\Delta w_0}{\Delta y} f_{y_0} \qquad \text{eq. 55}$$

$$\frac{\partial u_1}{\partial x} = \frac{\Delta u_0}{\Delta x} f_{x_1} \qquad \text{eq. 56}$$

$$\frac{\partial u_1}{\partial y} = \frac{\Delta u_1}{\Delta y} f_{y_1} \qquad \text{eq. 57}$$

$$\frac{\partial v_1}{\partial x} = \frac{\Delta v_0}{\Delta x} f_{x_1} \qquad \text{eq. 58}$$

$$\frac{\partial v_1}{\partial y} = \frac{\Delta v_1}{\Delta y} f_{y_1} \qquad \text{eq. 59}$$

$$\frac{\partial w_1}{\partial x} = \frac{\Delta w_0}{\Delta x} f_{x_1} \qquad \text{eq. 60}$$

$$\frac{\partial w_1}{\partial y} = \frac{\Delta w_1}{\Delta y} f_{y_1} \qquad \text{eq. 61}$$

$$\frac{\partial u_2}{\partial x} = \frac{\Delta u_2}{\Delta x} f_{x_2} \qquad \text{eq. 62}$$

$$\frac{\partial u_2}{\partial y} = \frac{\Delta u_0}{\Delta y} f_{y_2} \qquad \text{eq. 63}$$

$$\frac{\partial v_2}{\partial x} = \frac{\Delta v_2}{\Delta x} f_{x_2} \qquad \text{eq. 64}$$

$$\frac{\partial v_2}{\partial y} = \frac{\Delta v_0}{\Delta y} f_{y_2} \qquad \text{eq. 65}$$

$$\frac{\partial w_2}{\partial x} = \frac{\Delta w_2}{\Delta x} f_{x_2} \qquad \text{eq. 66}$$

$$\frac{\partial w_2}{\partial y} = \frac{\Delta w_0}{\Delta y} f_{y_2} \qquad \text{eq. 67}$$

$$\frac{\partial u_3}{\partial x} = \frac{\Delta u_2}{\Delta x} f_{x_3} \qquad \text{eq. 68}$$

$$\frac{\partial u_3}{\partial y} = \frac{\Delta u_1}{\Delta y} f_{y_3} \qquad \text{eq. 69}$$

$$\frac{\partial v_3}{\partial x} = \frac{\Delta v_2}{\Delta x} f_{x_3} \qquad \text{eq. 70}$$

$$\frac{\partial v_3}{\partial y} = \frac{\Delta v_1}{\Delta y} f_{y_3} \qquad \text{eq. 71}$$

$$\frac{\partial w_3}{\partial x} = \frac{\Delta w_2}{\Delta x} f_{x_3} \qquad \text{eq. 72}$$

$$\frac{\partial w_3}{\partial y} = \frac{\Delta w_1}{\Delta y} f_{y_3} \qquad \text{eq. 73}$$

Figure 5:
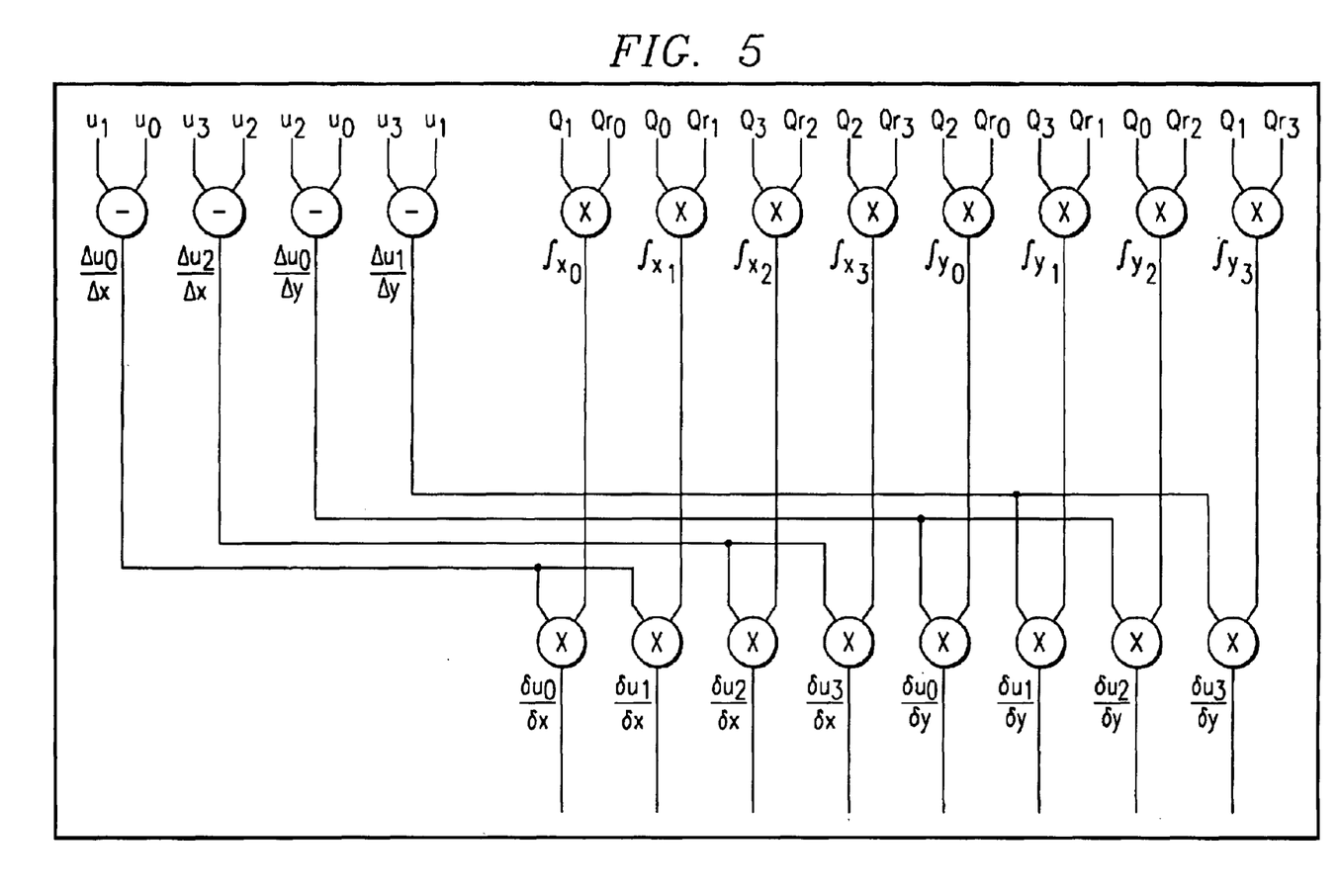
FIG. 5 depicts a schematic diagram illustrating a hardware implementation for the partials in accordance with the present invention.

Referring now to FIG. 5, a schematic diagram illustrating a hardware implementation for the partials is depicted in accordance with the present invention. The present system can be implemented by a series of subtracts and multiplies. The subtracts and first stage of multiplies can be done in parallel. The second stage contains only the remaining multiplies. The entire figure represents the hardware implementation of equations 33 through 40 and shows the number of multiplies and subtracts necessary for calculating the partials of the texture coordinate u for four pixels.

Figure 6:
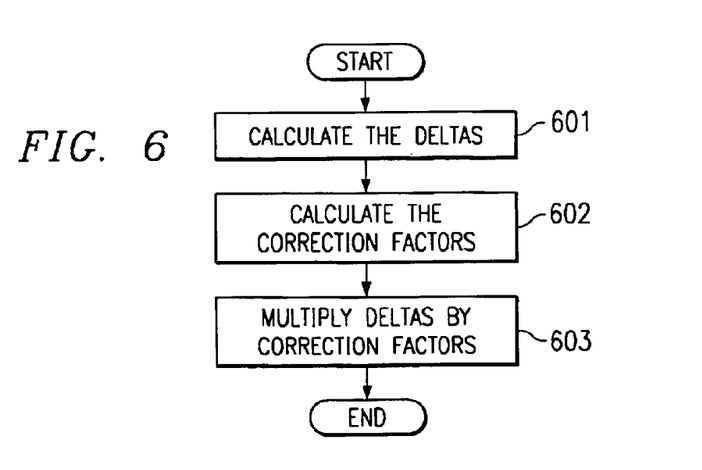
FIG. 6 depicts a flowchart illustrating the process of hardware implementation for the partials in accordance with the present invention.

Referring to FIG. 6, a flowchart illustrating the process of hardware implementation for the partials is depicted in accordance with the present invention. The process flow begins by calculating the deltas (step 601). This process uses a set of subtracts in parallel to create the deltas defined by equations 29 through 32. Next, the correction factors are calculated (step 602). The correction factors are a set of multiplies that take the incoming perspective coordinates and generate the factors that will be multiplied by the deltas (equations 42 through 49). In hardware, this occurs in parallel with the substraction calculations for the deltas (they are not dependent upon each other). After the correction factors are calculated, they are then multiplied by the deltas to obtain the true partials (step 603).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing perspective corrected texture coordinates, comprising the steps of:
    a) identifying texture coordinates at each of four adjacent pixels;
    b) performing a calculation to identify a difference between the texture coordinates;
    c) identifying a perspective correction factor based on perspective correction coordinates;
    d) generating partial differential equations by multiplying each texture coordinate difference by the perspective correction factor;
    wherein steps a) through d) include sharing data from each of the four adjacent pixels; and
    e) using the partial differential equations to render an image, wherein the rendered image is displayed on a display device.

2. The method according to claim 1, wherein the step of performing a calculation to identify the difference between coordinates uses a set of subtracts in parallel.

3. The method according to claim 1, wherein the step of identifying the perspective correction factor uses a set of multiplies in parallel.

4. The method according to claim 1, wherein the step of generating the partial differential equations for a single texture coordinate for all four pixels requires 12 subtracts and 32 multiplies.

5. The method according to claim 1, wherein subsequent coordinates are found by adding the partial differential equations in a given direction.

6. A computer program product in a computer readable medium for use in a data processing system, for processing perspective corrected texture coordinates, the computer program product comprising:
    a) first instructions for identifying texture coordinates at each of four adjacent pixels;
    b) second instructions for performing a calculation to identify a difference between the texture coordinates;
    c) third instructions for identifying a perspective correction factor based on perspective correction coordinates;
    d) fourth instructions for generating partial differential equations by multiplying each texture coordinate difference by the perspective correction factor;
    wherein instructions a) through d) further include instructions for sharing data from each of the four adjacent pixels; and
    e) fifth instructions for using the partial differential equations to render an image, wherein the rendered image is displayed on a display device.

7. The computer program product according to claim 6, wherein the instructions for performing a calculation to identify the difference between coordinates use a set of subtracts in parallel.

8. The computer program product according to claim 6, wherein the instructions for identifying the perspective correction factor use a set of multiplies in parallel.

9. The computer program product according to claim 6, wherein the instructions for generating the partial differential equations for a single texture coordinate for all four pixels require 12 subtracts and 32 multiplies.

10. The computer program product according to claim 6, wherein subsequent coordinates are found by adding the partial differential equations in a given direction.

11. A system for processing perspective corrected texture coordinates, comprising:
    a) a first identifying component which identifies texture coordinates at each of four adjacent pixels;
    b) a second identifying component which identifies the difference between the texture coordinates by performing a calculation;
    c) a third identifying component which identifies a perspective correction factor based on perspective correction coordinates;
    d) a generating component for generating partial differential equations by multiplying each texture coordinate difference by the perspective correction factor;
    wherein components a) through d) share data from each of the four adjacent pixels; and
    e) a rendering component for rendering an image using the partial differential equations, wherein the rendered image is displayed on a display device.

12. The system according to claim 11, wherein the second identifying component which performs a calculation to identify the difference between coordinates uses a set of subtracts in parallel.

13. The system according to claim 11, wherein the third identifying component which identifies the perspective correction factor uses a set of multiplies in parallel.

14. The system according to claim 11, wherein generating the partial differential equations for a single texture coordinate for all four pixels requires 12 subtracts and 32 multiplies.

15. The system according to claim 11, wherein subsequent coordinates are found by adding the partial differential equations in a given direction.

* * * * *

UNITED STATES PATENT AND TRADEMARK OFFICE
CERTIFICATE OF CORRECTION

PATENT NO. : 6,906,723 B2  Page 1 of 1
APPLICATION NO. : 09/820462
DATED : June 14, 2005
INVENTOR(S) : Ault, Jr.

It is certified that error appears in the above-identified patent and that said Letters Patent is hereby corrected as shown below:

<u>Column 7,</u>
Line 27, delete " $\dfrac{Q_0 \frac{\partial S}{\partial x} - S_0 \frac{\partial Q}{\partial x}}{\left(Q_0 \frac{\partial S}{\partial x} - S_0 \frac{\partial Q}{\partial x}\right)\frac{1}{Q_0}} - 1$ " and insert -- $\dfrac{Q_0 \frac{\partial S}{\partial x} - S_0 \frac{\partial Q}{\partial x}}{\left(Q_0 \frac{\partial S}{\partial x} - S_0 \frac{\partial S}{\partial x}\right)\frac{1}{Q_0}} - 1$ --.

Signed and Sealed this

Twenty-seventh Day of June, 2006

JON W. DUDAS
*Director of the United States Patent and Trademark Office*